INVENTOR
HERBERT F. WIEGANDT

United States Patent Office 3,435,625
Patented Apr. 1, 1969

3,435,625
PROCESS AND APPARATUS FOR THE CONTINUOUS SEPARATION OF SOLID MATERIALS CONTAINED IN A LIQUID
Herbert F. Wiegandt, Ithaca, N.Y., assignor to Institut Francais du Petrole des Carburants et Lubrifiants, Rueil Malmaison, France
Continuation-in-part of application Ser. No. 298,102, July 29, 1963. This application Mar. 20, 1967, Ser. No. 624,394
Int. Cl. B01d 9/02, 43/00; C07c 7/14
U.S. Cl. 62—58                                                   19 Claims

ABSTRACT OF THE DISCLOSURE

Solids are continuously separated from a liquid containing entrained solids by passing said liquid material into the bottom of a vertical column of increasing cross-section toward the top of the column. The column is provided with a filter in the upper portion thereof which serves to form a porous bed of the solid material which is gradually pushed to the top of the column by the entering flow of solids and liquid. Washing liquid is introduced at the top of the column to wash the solids before removal thereof from the column. The increase in the cross-section of the column and the pressure from the liquid-solid mixture introduced at the bottom of the column raises the porous bed of solids without undue pressure thereon.

---

This application is a continuation-in-part of Ser. No. 298,102, filed July 29, 1963, by Herbert F. Wiegandt, now abandoned.

FIELD OF THE INVENTION

The present invention relates to the separation of granular solid materials contained in a liquid, more particularly to a process and apparatus for the continuous separation of granular solid materials contained in a liquid wherein the solid materials are formed into porous beds.

PRIOR ART

While many processes and forms of apparatus have been devised for the separation of solid materials contained in liquid, most of these processes are directed to batch separation rather than to continuous operation. One particular area where improved separation processes have been sought is in the separation of crystals from a liquid. This separation has been generally accomplished by centrifuging but centrifuging has the double disadvantage of being slow and costly. It has, therefore, been desirable to attempt to eliminate these disadvantages by the development of a continuous crystallization process utilizing a simple apparatus and at minimum cost whereby the crystals can be separated without the necessity of centrifuging or of intermediate melting of the crystals.

SUMMARY AND OBJECTS

It is known from Ashley (U.S. Patent 3,070,969) to introduce continuously a slurry of crystals in a liquid into a filtration zone, from the bottom thereof, thus forming an ascending bed of crystals, removing the crystals from the top and washing the bed of crystals from the top. Ashley's filter is horizontal, whereas his apparatus is vertical and the section over the filter is cylindrical. Thus the angle between the filter and the enclosure over the filter is about 90°.

Carfagno (U.S. Patent 3,049,889) describes a filtration apparatus wherein the liquid is introduced at a level intermediate between the respective removal points for the liquid and the crystals. This is convenient when the crystals are lighter than the liquid, not when they are heavier since no substantial force is created by the liquid towards top.

It has been found that Ashley's apparatus is operable when the height of solids over the filter is reduced, for example when the ratio between the height of solids or column over the filter and the largest diameter of the filter level is up to about 1–1.5. If one tries to obtain higher heights of the bed, the power required quickly increases up to untolerable values and the bed either is blocked or advances by sudden thrusts which is quite detrimental. Also these higher pressures tend to agglomerate the bed and the washing tends to be inefficient.

Good washings necessitate ratios as above defined of at least 1.75, more preferably 2.5–10.

It has now been found that these higher heights may be obtained:

Without blockage or irregular thrusts,
With a reduced power,
Without excessive compression of the bed, thus under good washing conditions,
With the apparatus of this invention.

My new apparatus comprises an apparatus for the continuous separation of solid materials entrained in a liquid, and comprising an elongated enclosure, a filter positioned at an intermediate point in the enclosure through which the major portion of the liquid is extracted while solid materials remain in the enclosure, with at least the whole portion of the enclosure from the filter to the top having a continuously increasing cross-section towards the top, means for introducing a liquid containing solid materials into the lower end of the enclosure, means for removing the accumulated solid materials from the higher end of the enclosure, and means for introducing a washing liquid into the higher end of the enclosure for washing the solid materials accumulated therein.

Preferably also the apparatus comprises an abutment, for example, a circular abutment, at the top of the enclosure.

It is highly advantageous that the column over the filter exhibits ratios height/diameter as above defined of at least 1.75, preferably 2.5–10, and more preferably 3.25–10.

It is also preferred that the filter surface make an acute angle with the axis of the elongated enclosure, as opposed to the 90° angle of U.S. Patent 3,070,969. It has been found that the filter of this patent rapidly occludes whereas no occlusion arises when, as in my preferred embodiment, the filter is continuously swept by the advancing bed. The more acute is the angle the more efficient is the sweeping. More preferably the "conicity," i.e., the relative increase of diameter from the filter level to the top of the enclosure, with respect to the corresponding height increase, is comprised between 0.5 and 30%.

This is also why it is preferred that the filter be integral part of the enclosure and that it provides for a continuous surface therewith in the same general direction, for example, that it be integral part of an inverted frustum of cone.

It is essential that the filter be on the enclosure surface, at an intermediary point thereof, but never at the top thereof. A substantial part of the enclosure must be present between the filter and the top, for example at least 10% of the height of the enclosure of increasing cross-area, to provide for a sufficient washing zone.

In a preferred embodiment the cross-area of the column increases continuously from the feed point for the slurry to the top.

In the process of the present invention, the solid materials are continuously separated from a stream of entrainment liquid, i.e., the liquid containing the solid materials, by filtering the liquid in such a manner so as to form a porous bed of the solid materials. This porous bed is displaced by the force of the liquid flowing through at least a portion of the porous bed. The solid materials are removed from the downstream side of the porous bed. The solid materials may be subjected to a thorough washing before being withdrawn from the bed by a washing liquid passing through the bed in counterflow relation with respect to the displacement of the bed.

DESCRIPTION

The process may be carried out in an apparatus comprising a substantially vertical column, of which a portion has an increasing transverse section in the direction of displacement of the bed of solid materials. There is a filter in the column which forms an exit orifice for the liquid but which retains the granular solid materials in the column. The bed of solid materials is fed continuously from one end of the column by the flow of the liquid passing through the filter.

The granules of solid material that are supplied to the movable porous bed are entrained in the circulating liquid in such a manner that the thickness of the bed on the upstream side of the filter tends to increase, which in turn increases the force to which this side of the bed is subjected. This results in displacing the bed in the same direction as the flow of the entrainment liquid.

Where washing of the solid material is performed by a counterflowing liquid and where the netrainment liquid flows down from the top, the washing liquid should be introduced under pressure at the bottom of the column. However, in those instances when the entrainment liquid flows up from the bottom of the column, the washing liquid is introduced at the top of the column and flows downwardly therethrough under the force of gravity. In this instance, the portion of the bed above the filter is no longer immersed and the liquid that contained the solid material flows by gravity through the filter.

In a specific embodiment of the invention which will be presently described, the bed of solid materials is deposited from an ascending stream of liquid and is washed by a descending stream of washing liquid. The pressure of the ascending liquid stream is such to counterbalance the weight of a bed of drained solid materials above the filter so as to insure effective washing of the bed and to also counterbalance the forces of friction produced by the movement of the bed against the inner wall of the column. The rate of removal of solid materials at the upper side of the bed is regulated in proportion to the rate at which the solid materials are deposited at the lower side of the bed. As a result, the height of the bed below the filter will be maintained greater than the height of the bed above the filter. The process of this invention is considerably more effective and the full benefits thereof are obtained when the bed beneath the filter is maintained at a greater height than that portion of the bed of solid materials above the filter.

The use of a column whose transverse sectional area gradually increases in the direction of displacement of the bed of solid materials considerably reduces the frictional forces produced by the movement of the bed of materials against the inner wall of the column. Means are provided in the column for limiting the displacement of the solid bed. It is proposed to prevent the bed of solid materials from exceeding a certain height above the filter by continuously removing the solid materials from the top of the bed at a rate which will permit the lower portion of the bed to be maintained at a greater height below the filter than the height of the bed above the filter. At the same time, this removal of the solid materials prevents displacement of the bed in the ascending direction for a unit of time which would be greater than what would corresponding to the volume of material that is removed during the same unit of time. In order to provide for continuous operation with uniform results, the removal of solid materials from the top of the bed is regulated so as to maintain the lower portion of the bed at a substantially constant level.

In the purification of crystallizable liquids, the porous bed of solid materials is constituted by crystals produced by refrigeration of the liquid. In this case it is more advantageous to wash the bed of crystals in counterflow relation by a liquid having the chemical composition of the crystals as obtained by fusion of a portion of the crystals. This has the advantage of enabling the washing liquid to completely wet the crystals so as to permit rapid displacement of the impurities to the surfaces of the crystals and into the interstices between them.

Crystallization, which is one of the techniques commonly employed for the purification of liquids, can be easily carried out since it is only necessary that the liquid to be purified be cooled to a temperature below its freezing point. The resulting crystals can be readily removed by the present invention.

Other objects and advantages of the present invention will be apparent upon reference to the accompanying description when taken in conjunction with the following drawings wherein.

The process of the present invention will be described as applied to the purification of a liquid by crystallization. As such, the process may be considered as a process of crystallization whereby a porous bed of crystals is produced. The crystallization should be carried out in such a manner that the bed of crystals will have a porosity sufficient to permit the flow therethrough of the liquid at at rate which is sufficient to enable the liquid to flow upwardly through the bed.

Figure 1:
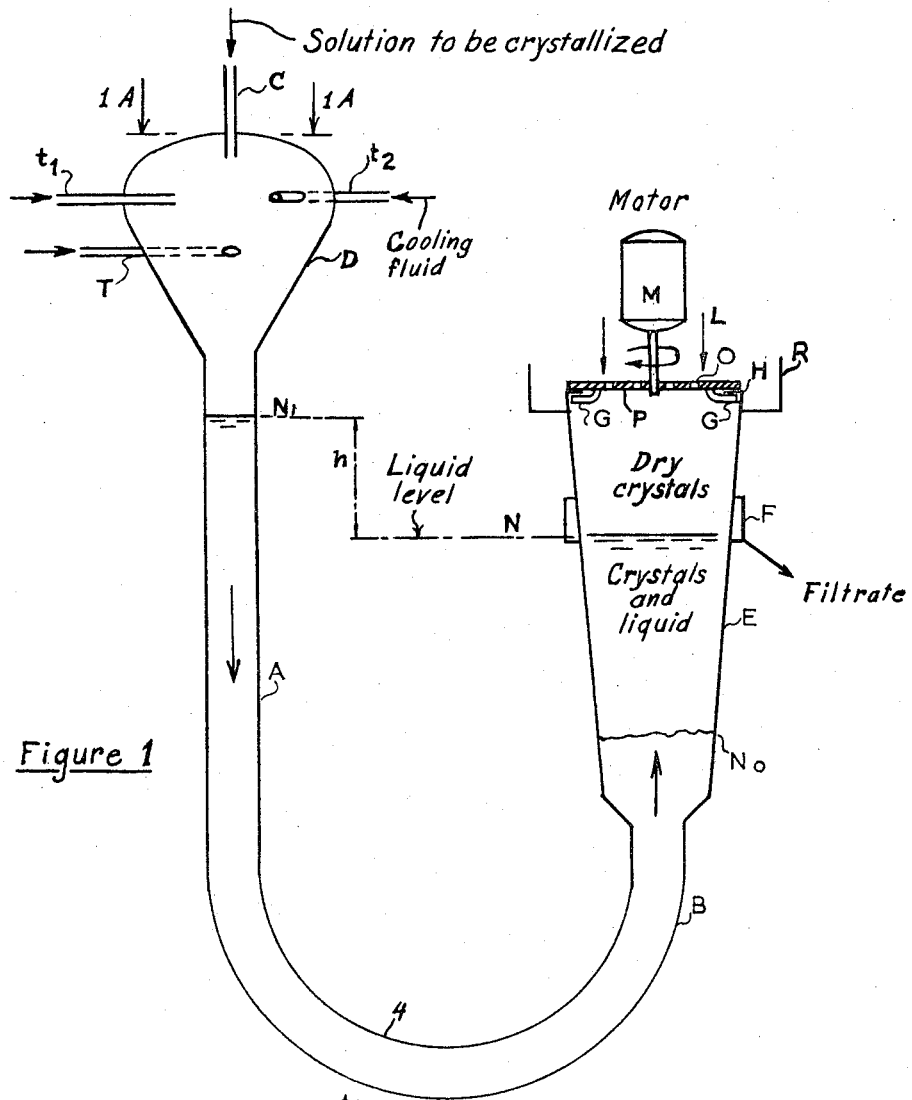
FIGURE 1 is an elevational view schematically showing the apparatus of the present invention as used for purification by crystallization.
Figure 2:
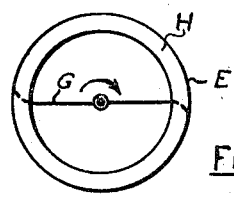
FIGURE 2 is a plan view of a scraper for removing crystals from the top of the porous bed of crystals formed in the column of FIGURE 1.

The apparatus for carrying out this process is schematically illustrated in FIGURE 1 and comprises a crystallizer unit D having a chamber therein in which the crystals are entrained in a descending stream of cooling liquid. The crystallizer unit D is connected at its lower end to a branch A of a U-shaped tube 4 which has a branch B on the end of which is positioned an ascending column E. A circular filter F is positioned at an intermediate point of the column E, and approximately at midpoint. The walls of the column E taper gradually outwardly so as to essentially form a truncated cone. The gradually increasing cross-sectional area of the column E proceeding in an upward direction reduces the friction formed by the movement of the solid bed on the inner wall of the column E. A scraper G, shown in FIGURES 1 and 2, is provided at the upper or downstream end of the column E for the continuous removal of crystals formed at the top of the porous bed of solid materials. The scraper G is driven by a motor M.

The bed of solid materials within the column E is maintained at a constant height by controlling the rate at which the bed is allowed to pass circular abutment H. The crystals that are removed are collected in an annular receptacle R mounted around the upper end of the column E.

The scraper G cuts the bed from the lower side of the circular abutment H and it is rotated at such speed that the height of the bed below the level N will be greater than the height of the bed above the level N. The scraper comprises also a rotating blade $p$ and it may conventiently carry a distributor plate having orifices O therein for the passage therethrough of a washing liquid, as indicated at L. Thus, the scraper is driven at a controlled speed by the motor M to keep the bottom surface of the porous bed of crystals at a constant level.

One method for the production of crystals consists in effecting crystallization in a space filled with gas wherein one or more jets of a cooling liquid are directed upon the stream of liquid to be crystallized in such a manner that crystallization will commence in the gaseous space and not inside the body of liquid. With reference to FIGURE 1, the liquid to be crystallized is injected in the form of a jet through a small diameter conduit C into enclosed chamber D containing a gaseous atmosphere. The jet of liquid is quickly cooled in the gaseous space by means of one or more jets of a cooling fluid in which the liquid to be crystallized is not soluble with the cooling fluid being introduced into the chamber D through the smaller diameter conduits $t_1$, $t_2$ and $t_3$. This cooling arrangement effects an immersion which favors the formation of agglomerates of elongated crystals with large specific surface from which the porous bed of crystals is readily formed. The jets from conduits $t_1$, $t_2$ and $t_3$ that are directed toward the stream of liquid from the tube C remain above the liquid surface of the cooling liquid so that the crystals are largely formed in a vapor space rather than within the continuous liquid phase.

The movement of the crystals formed in the space D down into the branch A of the end tube can be accomplished by moving the cooling liquid in tube A in a vortex movement. This is accomplished by introducing through a conduit T positioned tangentially to the wall of the chamber D a strong jet of cooling liquid which is thus given a rotary motion in the chamber D (see FIGURES 1 and 1A).

This method of crystal formation can be carried out in conjunction with the countercurrent washing of the crystals by connecting the washing column to the branch B of the U-shaped tube.

The formation of crystal agglomerates of irregular shape can also be carried out by evaporation of a cooling liquid while it is being brought into contact with the liquid to be crystallized when this later liquid is still in the vapor space. As an alternative, thin films may be formed by crystallization at the surface of the cooling liquid.

Another method of forming crystals having a structure conducive to the formation of porous beds consists of injecting the liquid to be crystallized directly into a liquid in which it is insoluble and which also serves as a cooling liquid. The injection is carried out by means of an injector provided with reheating means to produce in the vicinity of the injector a temperature gradient inside the liquid which will permit the injection of the solution to be crystallized while in globular form where the globules are conducive to the formation of spherical agglomerates of crystals.

This method of crystal formation can be carried out at the bottom of the column E that is used for the countercurrent washing of the crystals. By reference to FIGURE 1B there is shown a heated injector I positioned in the center of a chimney K opening into the bottom of the column E. The chimney K contains reheating means J positioned around the injector I and the bottom of the chimney is connected by a conduit S and a valve V with the bottom of the column E. This arrangement will function similar to a thermosyphon and will create an ascending stream of hot liquid in the chimney parallel to the stream of liquid to be crystallized so as to permit the latter liquid to be gradually cooled.

Figure 1A:
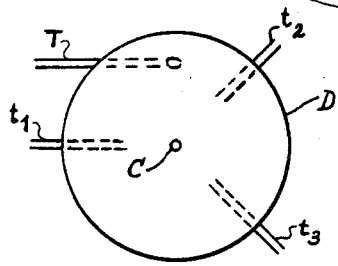
FIGURE 1A is a sectional view taken along line A—A of FIGURE 1.
Figure 1B:
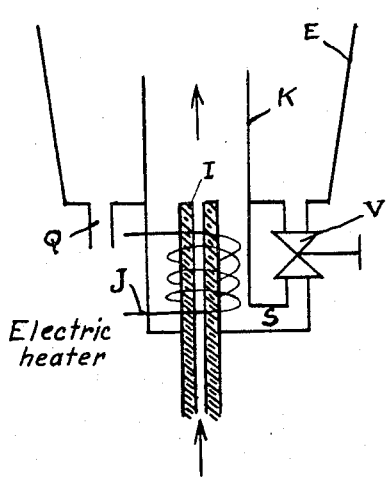
FIGURES 1B, 1C and 1D are vertical sectional views taken through other forms of crystallizers which can be substituted for the crystallizer of FIGURE 1.
Figure 1C:
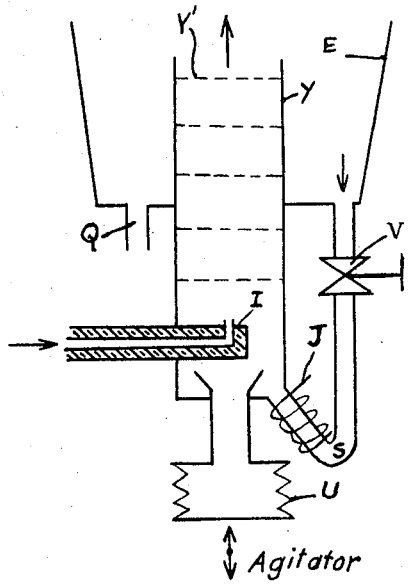

In FIGURE 1C there is illustrated another form of apparatus for the injection of drops in large amounts and of more uniform size. This modified apparatus comprises a vertical column Y provided with vertically spaced partitions Y' or other packing elements such as Raschig rings. There is also provided a pulse generator U for continually agitating the liquid to be crystallized. The diameters of the globules can be regulated by adjusting the rate of injection and the frequency of the pulsations.

Figure 1D:
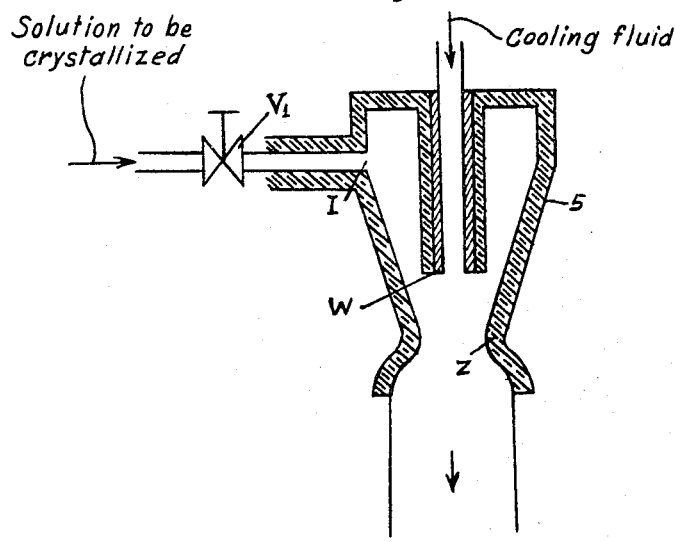

Proceeding next to FIGURE 1D there is shown an apparatus suitable for carrying out another method for the formation of small size crystals which can be employed to form porous beds. In this modification the liquid to be crystallized is aspirated by the reduction of pressure caused by the flow of cooling fluid in a tube with a choke. This apparatus comprises a heating injector I for the liquid to be crystallized, controlled by a valve $V_1$ and discharging into a similarly heated chamber 5 having the shape of a truncated cone. The smaller end of the chamber 5 is provided with a constriction Z toward which a nozzle W for the discharge of cooling fluid is directed. The fluid is preferably a liquid in which the liquid to be crystallized is insoluble, or a compressed gas. The passage of this cooling fluid through the constriction Z creates a reduction of pressure in the chamber 5 above, thereby drawing in the liquid to be crystallized while producing small crystals therefrom.

The crystallizing units shown in FIGURES 1, 1A and 1D are preferably placed at the upper end of branch A of the U-tube 4. The crystals that are formed are entrained in a descending stream of cooling liquid in which the liquid to be crystallized is not soluble. This descending stream of liquid is then directed upwardly to the branch B of the U-tube and then into the filter column E from which the filtrate is discharged. The filter column contains the filter above which a mass of separated crystals will collect with the crystals then being washed by the descending flow of washing liquid.

This continuous method of separation of the solid materials from a liquid is associated with a descending flow of cooling fluid carrying with it the crystals in a rotary or vortical motion.

In order to carry out this process with the greatest efficiency, it is preferable to maintain a sufficiently thick bed of solid materials below the filter for the following reasons:

(1) Since the bed of solid materials is formed continuously from granular materials conveyed to the lowest surface of the bed by the liquid, this lower bed is not particularly homogeneous but the bed tends to become more uniform toward its upper portion because of the hydraulic pressure of the entrainment liquid.

(2) The thicker the lower portion of the bed below the filter, the less entrainment liquid must be used for compacting the bed. This is advantageous since it is often necessary to recycle a large portion of the entrainment liquid and the cost of this recycling will be reduced. This advantage is particularly appreciable when the density of the solid materials is greater than the density of the entrainment liquid.

(3) Washing by countercurrent flow will be accomplished under more favorable conditions since the quantity of entrainment liquid that impregnates a part of the bed located above the filter will be less because with the same ascending force exerted upon the solid bed it will be possible to reduce the quantity of entrainment liquid used when the height of the bed below the filter is increased.

As pointed out above, it is necessary to provide some means for limiting the displacement of the porous bed of solid materials or crystals. For example, if in such a porous bed $V_1$ is the volume of that portion of the bed below the filter, $V_2$ the volume of the bed above the filter, and $\Delta V$ the volume of solid removed from the bed at the top thereof, then since $V_1 > V_2$, the following relationship is true—

$$\frac{\Delta P}{V_1} < \frac{\Delta V}{V_2}$$

Since the upward force exerted by the entrainment liquid is proportional to $V_1$, the amount of decrease of this ascending force for a flow that is presumed to be constant will be less than the relative decrease of weight resulting from the upward displacement of a volume V of solid materials. From this it is apparent that the bed of granular materials will tend to maintain its upward movement.

With the foregoing description in mind, the mode of operation is as follows.

The crystals formed in the crystallizer unit are entrained by the descending flow of cooling fluid which then flows upwardly through the branch B of the U-shaped tube 4 and upwardly through the column E to the filter F. The liquid then passes the filter F and is discarged to the exterior of the column E while the crystals collect in the column E. If the crystallizer unit such as shown in FIGURES 1B and 1C is used, wherein the unit is mounted at the lower end of the column E, the crystals are similarly entrained in the flow of cooling liquid toward the top of the column where they will accumulate. The friction resulting from the upward movement of the crystals against the inner wall of the column E is reduced in view of the outwardly tapering walls of the column in the direction of movement of the crystals.

In that portion of the column E above the filter F, a porous bed of drained crystals will be formed and displaced toward the top or downstream end of this column. This bed of crystals is washed by a counterflowing liquid obtained by fusion of a small portion of the crystals collected in the receptacle R. This counterflowing washing liquid will carry impurities during its passage through the porous bed and is then removed by the filter F. A purity gradient for the crystals will be formed in this manner wherein the crystals are continuously purified until they reach the top of the column E. The crystals that are removed by the scraper G from the top of the bed will accordingly have a high degree of purity. The scraper is operated at such a speed so as to permit the removal per unit time of a volume of crystals which is substantially equal to the volume of crystals which is added at a lower or upstream end of the bed during the same unit of time.

While many forms of apparatus can be employed to control the motor in this manner, one preferred arrangement is a servo mechanism which is controlled by the changes of position of the interface between the lower extremity of the bed of crystals and the entrainment liquid. With the constant flow of entrainment liquid the servo mechanism is responsive to variations of pressure below the bed of crystals.

The relation between the speed of the motor which determines the rate of removal of the crystals and the rate of addition of crystals at the base of he bed can also be obtained by maintaining the speed of the motor constant and by adjusting the rate at which the solid materials are added. This can be accomplished by varying the velocity at which the entrainment liquid is introduced at constant concentration of solid materials or by varying the concentration of solid materials while the velocity of the entrainment liquid remains constant. As an alternative, combinations of these two methods can also be employed.

When employing the apparatus of FIGURE 1 in carrying out the present process, it is necessary that the pressure applied by the liquid of branch A should be sufficient to cause the liquid in column E to rise to the level of the filter F and to also support the bed of crystals that has formed in column E above the filter F.

This pressure can be obtained by employing a tube A of such a height that the level of the liquid is established sufficiently high above the level N of the filter so that the difference between the corresponding pressures compensates for the weight of the bed of solid materials above the filter. That is to say that the weight of the liquid of height $h$ (see FIGURE 1) corresponding to the difference between the level $N_1$ of the liquid in the tube A and the level N at which liquid is discharged from the filter F should be equal to the weight of the bed of crystals above the level N. If the gas in the chamber D is at atmospheric pressure, the level of the liquid in the tube A will be automatically maintained at the height $N_1$ necessary for this purpose if the tube A is of sufficient height.

If it is desired to limit the size of the apparatus, a tube A may be used whose height is less than what would be required for this natural hydrodynamic equilibrium. In this instance, the pressure which would correspond to the required height of liquid would be obtained by the pressure of the gas in the chamber D above the level of the liquid. Generally, this would only require a slight positive pressure of the order of 0.1 to 1.0 atmosphere, with the value of this pressure being dependent on the height of the bed of crystals above the level of the filter which should be at least equal to 5% of the height of the crystals in the liquid phase below the filter.

It is preferable to use an entrainment liquid whose density is greater than that of the crystals so as to facilitate the upward movement of the crystals in the separation column E. However, the process of this invention can also be carried out with a liquid whose density is equal to or less than that of the crystals. In this latter situation, it is no longer advantageous to entrain the crystals by the rotary movement imparted to the cooling liquid since gravity then acts in the same direction as the movement of the liquid.

It is to be understood that the various procedures described above for carrying out the process of the present invention are optional and can be readily modified without departing from the scope of the invention. For example, it is possible to employ a separating column whose conicity above the filter is different from its conicity below the filter. It is also possible to employ other forms of scrapers and other structures for controlling the speeds of rotation or to mount several scraping blades.

The process of the present invention can be employed for the filtration and washing of all solid materials which can occur in granular form. Several examples of the applications of this invention which are by no means limiting are for the washing of ground minerals, for extracting oil from crushed peanuts, olives, nuts, almonds, etc., or for the separation and washing of crystals obtained from the cooling of organic or inorganic liquids. The process can be used for washing uranium minerals with acid, wherein the acid reacts with the uranium in the mineral to form a uranate which is then separated from the acid solution. When the process is used for extracting a liquid from a somewhat pasty substance, the washing liquid in the counterflow will be a solvent of the liquid to be extracted.

The process of this invention is equally applicable to the continuous filtration of all mixtures of liquids and solids and particularly of suspensions of finely divided solids and liquids. Where this method of filtration is to be used for the separation of small amounts of solid impurities, it may be necessary to add other granular solids to the liquid to be filtered in order to form the porous bed.

Other applications of this process are in the removal of paraffin or wax from liquid petroleum products. The oil containing the wax can be eliminated by counterflow washing with a solvent for the oil.

It is apparent that the process of this invention can be used in all those cases where it is desired to have counterflow washing. This makes possible a method of washing that is preferable to methods using successive batches. The enrichment of the washing liquid in impurities is progressive so as to establish a concentration gradient in the moving bed wherein the lowest concentration of impurities is found at the top of the bed from where the solids are continuously removed in a pure form.

Comparative experiments

I. There is used the exact apparatus described in Ashley's patent: it has 3.5 meters height over the horizontal filter with a cylindrical shape, vertical axis and a constant diameter of 1 meter over the filter. This height was previously determined to be the minimum allowing a good counter-current washing of the bed of crystals over the filter.

At the top a cutting device was provided to carry away the crystals attaining the top.

Below the filter the shape was frustoconical with 15 cm. diameter at the foot and 65 cm. diameter at the filter level and a height of 5 meters (below filter).

This corresponds to a 10% conicity (defined as the variation of diameter with respect to the height:

$$0.65 - 0.15/5)$$

The apparatus was made of polished steel (to avoid rubbing forces).

A slurry of crystals of paraxylene in their mother-liquor (mixture of the xylene isomers) was fed from the bottom at a rate of about 5,000 liters per hour, said slurry containing about one third by weight of crystals. Said slurry went up in the apparatus and while the liquid filtered, the solids progressively accumulated both below and over the filter level.

The height of the crystal bed over the filter (H) was noted, as well as the relative pressure (over the atmospheric pressure) in bars, as determined by a manometer placed at the lowest point of the frustoconical channel, thus at height minus 5 meters with respect to the filter.

The following figures were obtained.

| H, meters: | Relative P in bars |
|---|---|
| 1.75 | 0.6 |
| 2.2 | 0.75 |
| 2.5 | 0.9 |
| 2.9 | 1.05 |
| 3.2 | 1.55 |
| 3.2 | 2.7 |

At this time, the operation had to be stopped since the bed did not rise any more and the solids accumulated down to the feed pipe at the bottom.

II. The apparatus was reconstructed: the part below the filter and the filter itself were not changed but the cylindrical part over the filter was replaced by a frustoconical part of same height having 1 meter diameter at the bottom and 1.07 meter diameter at the top. Thus the conicity was:

$$100 \times \frac{0.07}{3.5} = 2\%$$

The apparatus was started 3 times as described herebefore and then operated for 48 hour-periods without trouble. The following figures are an average over these 3 operations.

| H, meters: | Relative P in bars |
|---|---|
| 1.8 | 0.6 |
| 2.2 | 0.7 |
| 2.5 | 0.8 |
| 3.0 | 0.9 |
| 3.5 | 1.2 |

These last figures remained constant during the working periods.

III. In a second modification the filter and enclosure over the filter of II were removed and the previous frustum of cone below the filter was lengthened up to level 3.5 m. over the previous filter, however with a somewhat higher conicity (12%) in order to have the same diameter of 1.07 m. at the top.

The filter was located at the same average level as before. It had the same surface but it formed part of the frustum of cone and thus exhibited the same conicity as the cone.

The following figures were obtained.

| H, meters: | Relative P in bars |
|---|---|
| 1.8 | 0.6 |
| 2.3 | 0.7 |
| 2.7 | 0.8 |
| 3.2 | 0.9 |
| 3.5 | 1 |

IV. The following conclusions are to be noted:

(a) To obtain the same height H, for example 3.2 meters, far higher pressures are necessitated in the first case (1.55 bars as compared to 0.9 bar) which means far higher mechanical energy consumption.

(b) It is not possible to rise over 3.2 meters in the first case, which is insufficient for a good washing of the bed. Even for this height, the operation must be stopped since the bed is blocked.

(c) Even for same heights over the filter, due to necessary higher pressures P and rubbing forces, the washing is less efficient in the first case since the bed is denser and cannot be traversed by high flows of washing liquid.

(d) The orientation of the filter is critical for obtaining the optimal results.

It will be understood that this invention is susceptible to modification in order to adapt it to different usages and conditions and, accordingly, it is desired to comprehend such modifications within this invention as may fall within the scope of the appended claims.

I claim:

1. An apparatus for the continuous separation of solid crystals entrained in an organic liquid, and comprising an elongated enclosure, an abutment at the higher end of the enclosure, a filter positioned at an intermediate point in the enclosure through which the major portion of the said organic liquid is extracted while solid crystals remain in the enclosure, with at least the whole portion of the enclosure from the filter to the top having a continuously increasing cross-section towards the top, means for introducing an organic liquid containing solid crystals into the lower end of the enclosure, means for removing the accumulated solid crystals from the higher end of the enclosure, and means for introducing a washing liquid into the higher end of the enclosure for washing the solid crystals accumulated therein.

2. An apparatus as claimed in claim 1, wherein the relative increase of diameter from the filter level to the top of the enclosure with respect to the corresponding height increase is comprised between 0.5 and 30%.

3. An apparatus as claimed in claim 1, wherein the ratio between the height of the portion of increasing cross-section of the enclosure over the filter to the maximal diameter of the enclosure at the filter level is at least 1.75.

4. An apparatus for the continuous separation of solid crystals entrained in an organic liquid, and comprising a continuous column of substantially vertical axis with at least the higher portion of the column having a continuously increasing cross-section towards the top, the relative increase of diameter in this higher portion of the column being comprised between 0.5 and 30% with respect to the corresponding level increase, an abutment at the higher end of the said column, a filter positioned at a point of said higher portion of the column, said filter forming part of the column, increasing in diameter towards top of a value in the same range as the column and being separated from the top by a substantial part of said higher portion of the column, means for introducing an organic liquid containing solid crystals into the lower end of the column, means for removing the accumulated solid crystals from the higher end of the column and means for introducing a washing liquid into the higher end of the column.

5. An apparatus as claimed in cliam 4, wherein the ratio between the height of the portion of increasing cross-section of the column over the filter to the maximal diameter of the column at the filter level is at least 1.75.

6. An apparatus as claimed in claim 4, wherein the ratio between the height fo the portion of increasing cross-section of the column over the filter to the maximal diameter of the column at the filter level is 2.5–10.

7. An apparatus as claimed in claim 5, wherein the higher part of the column is frusto-conical with the filter forming integral part of the frustum of cone.

8. An apparatus for continuously separating solid crystals entrained in an organic liquid, and comprising a U-shaped tube having a pair of branches, a substantially vertical column having a gradually increasing cross-section with the smaller cross-section upstream and being connected to the end of one of said branches, an abutment at the higher end of the enclosure, a filter at an intermediate point in said column and retaining therein the solid crystals, means for removing the solid crystals from the downstream end of said column, means for introducing a washing liquid inot said column through the downstream end thereof, a funnel-shaped crystallizer unit having its smaller end connected to the other of said pair of branches, a conduit entering said crystallizer unit for introducing therein an organic liquid to be crystallized, a plurality of additional conduits entering said crystallizer unit for introducing cooling fluid therein with at least one of said additional conduits directing the cooling fluid into the crystallizer unit so that the cooling fluid reaches the stream of organic liquid to be crystallized therein, at least one other of said additional conduits discharging tangentially into the crystallizer chamber.

9. An apparatus as claimed in claim 8, and further comprising means on said crystallizer unit for producing a positive pressure therein.

10. An apparatus as claimed in claim 8, and further comprising means on said crystallizer unit for producing a positive pressure therein, there being a constriction in a wall of said crystallizer chamber and communicating with said conduit for introducing the liquid to be crystallized, and means for injecting a cooling fluid through said constriction so that the pressure reduction in the crystallizer chamber caused by the flow of the cooling fluid through the constriction will cause the liquid to be crystallized to be drawn into said chamber.

11. An apparatus for the continuous separation of solid crystals entrained in an organic liquid, and comprising a substantially vertical column with at least the downstream portion of the column having a gradually increasing cross-section, there being a fixed abutment at the downstream end of the portion of the column, means for introducing an organic liquid containing solid crystals into the upstream end of the column, a filter positioned midway in the increased cross-section portion of the column, for retaining therein solid crystals filtered from the liquid, means for removing the accumulated solid crystals from the downstream end of the column, means for introducing a washing liquid into the downstream end of the column for washing the solid crystals accumulated therein, a conduit entering the lower end of said column for introducing a cooling liquid therein, an injector entering said column for introducing an organic liquid to be crystallized, means for heating said injector, and means for circulating a portion of the cooling liquid around said injector which is in communication with the lower portion of the column and which contains the heating means.

12. An apparatus as claimed in claim 11, wherein said circulating means comprises a pulsating column having perforated baffles therein.

13. A method of continuously separating solid crystals entrained in an organic liquid, and comprising the steps of introducing a continuous stream of an organic liquid containing said solid crystals at the first end of an enlongated zone, withdrawing said organic liquid from the elongated zone by filtration at an intermediary point thereof, thus forming in said zone a porous bed of solid crystals, continuously increasing the cross-section area of said bed over substantially the entire length of the bed in the direction of flow, and displacing the bed by the force exerted by the flowing liquid, flowing a washing liquid through at least a part of the porous bed downstream with respect to the withdrawal point for the entraining liquid, in countercurrent contact with the latter part of the bed, withdrawing the washing liquid by filtration at an intermediary point of the elongated zone and removing the solid crystals from the second end of the elongated zone.

14. A method of continuously separating solid crystals entrained in an organic liquid, and comprising the steps of introducing a continuous stream of an organic liquid containing solid crystals at the lower end of an elongated substantially vertical zone, withdrawing the liquid by filtration from the elongated zone at an intermediary level thereof, thus forming a porous bed of solid crystals in said zone, continuously increasing the cross-section of said bed, over substantially the entire length of the bed, and displacing said bed upwards by the forces exerted by the flowing liquid, flowing a washing liquid through at least a part of the porous bed above the liquid withdrawal point countercurrently to said part of the bed, withdrawing the washing liquid by filtration in admixture with the entraining liquid and removing the solid crystals from the upper part of the elongated zone.

15. The method of claim 14, wherein the withdrawal level for the entraining liquid is above the middle level of the bed.

16. A method of continuously separating solid crystals entrained in an organic liquid and comprising the steps of filtering a continuous upward stream of an organic liquid containing solid crystals to form a substantially vertical porous bed of the solid crystals, flowing a continuous upward stream of organic liquid containing solid crystals through the lower portion of the porous bed to displace upwardly the bed by the force exerted by the fllowing liquid, withdrawing said liquid by filtration at an intermediary point of the bed continuously increasing upwardly the cross-section area of the porous bed over substantially the entire length of the bed, then restricting said cross-section area of the porous bed at the top thereof, in order to limit the ascending movement of the bed, removing the solid crystals from the top of the bed with rotating scraping means and adapting the height of the porous bed by controlling the rotational velocity of said scraping means.

17. A method of continuously separating solid materials entrained in a liquid and comprising the steps of filtering a continuous upward stream of liquid containing solid materials to form a substantially vertical porous bed of solid materials, flowing a continuous upward stream of liquid containing solid materials through the lower portion of the porous bed to displace upwards the bed by the force exerted by the flowing liquid, withdrawing said liquid by filtration at an intermediary point of the bed, continuously increasing upwardly the cross-section area of the porous bed over substantially the entire length of the bed, wherein the relative increase in cross-section area of the bed is comprised between 0.5 and 30% with respect to the corresponding height increase, flowing a washing liquid downwardly through at least a portion of the higher part of the porous bed, withdrawing the washing liquid by filtration at an intermediary point of the bed and removing the solid material from the top of the bed.

18. The method of claim 17, wherein the liquid stream containing solid material is introduced into the bottom of an elongated structure containing a filter wherein the ratio between the height of the portion of increasing cross-section of the enclosure over the filter to the maximum diameter of the enclosure at the filter level is at last 1.75.

19. A metod of continuously separating solid materials entrained in a liquid comprising the steps of introducing a stream of liquid containing solid materials at the lower end of a continuous column of substantially vertical axis with at least the upper part of the said column having a continuously increasing cross-section towards the top thereof, the relative increase of diameter in this upper portion of the said column being between 0.5 and 30% with respect to the corresponding level increase, withdrawing the liquid by filtration through a filter positioned at a point of said upper portion of the said enclosure, said filter forming part of the column, and increasing in diameter towards the top of a value in the same range as the column and being separated from the top by a substantial part of said higher portion of the column, the ratio between the height of the portion of increasing cross section of the column above the filter to the maximum diameter of the column at the filter level being 2.5–10, flowing a washing liquid through the porous bed of said solid material in countercurrent flow relation to the flow of the liquid and removing the said solid material from the top of the bed at such a rate so as to maintain the bottom of the bed at a level which is substantially independent of the rate at which the solids are added to the bed.

References Cited

UNITED STATES PATENTS

| | | | |
|---|---|---|---|
| 3,049,889 | 8/1962 | Carfogno | 62—58 |
| 3,070,969 | 1/1963 | Ashley | 62—58 |
| 3,148,143 | 9/1964 | Donoth | 62—58 |
| 3,160,490 | 12/1964 | Fame | 62—58 |
| 3,290,891 | 12/1966 | De Lano | 62—58 |
| 1,028,304 | 6/1912 | Tourangeau | 210—433 |

NORMAN YUDKOFF, *Primary Examiner.*

U.S. Cl. X.R.

23—273; 62—123; 210—433